United States Patent [19]
Adel et al.

[11] Patent Number: 6,082,892
[45] Date of Patent: Jul. 4, 2000

[54] TEMPERATURE MEASURING METHOD AND APPARATUS

[75] Inventors: Michael E. Adel, Yaakov; Dario Cabib, Timrat; Yaron Ish-Shalom, Kiryat-Tivon; Shmuel Mangan, Ramot Remez, all of Israel

[73] Assignee: C.I. Systems Ltd., Migdal Haemek, Israel

[21] Appl. No.: 08/947,502

[22] Filed: Oct. 10, 1997

Related U.S. Application Data

[63] Continuation-in-part of application No. 08/392,010, Feb. 21, 1995, abandoned, which is a continuation-in-part of application No. 08/066,257, May 25, 1993, abandoned.

[30] Foreign Application Priority Data

May 29, 1992 [IL] Israel ......................................... 102055

[51] Int. Cl.[7] ............................. G01K 11/00; G01K 5/58; G01K 5/62
[52] U.S. Cl. ............................................................. 374/123
[58] Field of Search .................................... 374/120, 121, 374/123, 126, 128, 130, 131, 161

[56] References Cited

U.S. PATENT DOCUMENTS

| | | | |
|---|---|---|---|
| 2,909,924 | 10/1959 | Flook, Jr. et al. | 374/123 |
| 3,057,200 | 10/1962 | Wood | 374/123 |
| 4,790,669 | 12/1988 | Christensen | 374/131 |
| 4,841,150 | 6/1989 | Walter | 374/161 X |
| 5,004,913 | 4/1991 | Kleinerman | 374/161 X |
| 5,029,177 | 7/1991 | Patton | 374/126 |
| 5,118,200 | 6/1992 | Gat et al. | 374/128 |
| 5,170,041 | 12/1992 | Amith et al. | 374/123 X |
| 5,714,392 | 2/1998 | Dawson et al. | 374/124 X |
| 5,727,017 | 3/1998 | Maurer et al. | 374/9 |
| 5,738,440 | 4/1998 | O'Neill et al. | 374/9 |

*Primary Examiner*—Hezron Williams
*Assistant Examiner*—Willie Morris Worth
*Attorney, Agent, or Firm*—Mark M. Friedman

[57] ABSTRACT

A method of remotely measuring the temperature of a body, such as a semiconductor wafer, whose transparency varies with both wavelength and temperature and is characterized by an optical absorption edge. The body is illuminated at wavelengths on either side of the optical absorption edge. Based on the measured reflectivity at wavelengths shorter than the optical absorption edge, the direct reflectivity at wavelengths longer than the optical absorption edge is predicted and used to estimate the component of total reflectivity, at wavelengths longer than the optical absorption edge, which corresponds to propagation through the body and reflection back through the body. Light reflected from the body, measured in an "active" channel, is distinguished from light emitted passively by the body and measured in a "passive" channel. In the case of an opaque body, this allows the estimation of the emissivity of the body, and a temperature estimate based on Planck's law.

17 Claims, 5 Drawing Sheets

TEMPERATURE MEASURING METHOD AND APPARATUS

This is a continuation-in-part of U.S. patent application Ser. No. 08/392,010, filed Feb. 21, 1995, now abandoned which is a continuation-in-part of U.S. patent application Ser. No. 08/066,257, filed May 25, 1993, now abandoned.

FIELD AND BACKGROUND OF THE INVENTION

The present invention relates to a method and apparatus for remotely monitoring the temperature of a body. The invention is particularly useful for remotely monitoring the temperature of a semiconductor wafers and is therefore described below with respect to this application.

In the microelectronics and optoelectronics industries, semiconductor wafers and other devices are subjected to various multistage processes, including plasma etching, chemical vapor deposition, plasma vapor deposition, ion implantation, molecular beam epitaxy, etc. During the processing of such semiconductor devices, it is critical to monitor the temperature of the device at each stage, not only to achieve the required properties of the layer in the device being created or modified in the respective stage, but also to ensure that the temperature does not exceed that which will cause degradation of the layers created or modified in preceding stages. At the present time, the technique generally used for remotely sensing the temperature of a semiconductor wafer during processing is radiometric and relies on sensing the intensity of infrared black body radiation emitted by the semiconductor.

Arima et al., U.S. Pat. No. 4,979,134, describes a method for measuring surface temperature of a semiconductor wafer substrate; however, the method therein described is limited to wavelengths less than 1 micron, where the semiconductor is opaque and is therefore limited to temperatures above about 500° K.

Walter, U.S. Pat. No. 4,841,150, describes a method and apparatus for thermal mapping of semiconductors by a reflectivity technique which relies on a shift with temperature in the wavelength of light corresponding to the band gap energy. However, the technique described in that patent cannot be used as a practical manner to determine the temperature of real life process semiconductor wafers, because in the vast majority of cases, the presence of back and front side films causes constructive and destructive optical interference phenomena which swamp the band edge optical phenomenon.

Another technique is described by Kirillov et al. in U.S. Pat. No. 5,118,200. Here the substrate is illuminated with a source of continuous spectrum light and the exiting light is analyzed to determine its intensity as a function of wavelength. The wavelength at the point of inflection in the wavelength-intensity curve is used to is determine the substrate temperature. Although the point of inflection technique reduces the need for precise information of the spectral location of the energy gap in the temperature measurement procedure, it does not compensate for deviations in the spectral position of the point of inflection due to the presence of thin dielectric or semiconductor films on the wafer as expected in a real life processing environment.

In addition, neither the Walter nor the Kirillov patents describes embodiments which are capable of measuring the temperatures of wafers which are opaque due to highly doped bulk or due to the presence of opaque films.

The use of reflection intensity information in conjunction with Kirchoff's Law in order to compensate for unknown variations in emissivity is well known and has been an important aspect in the literature for general temperature measurement, for example U.S. Pat. No. 3,433,052 of Maley et al.

Nulman et al., U.S. Pat. No. 4,919,542 have utilized this concept for the case of temperature measurement of semiconductors in the wavelength band of from 4.5 to 6 microns. However, the technique described there is limited for two reasons. First, the technique is only applicable to wafers which are opaque in this wavelength regime (i.e., above 600° K or highly doped), unless complex calibration procedures employing contact thermometry are used. Second, the required precision of emissivity compensation is very high because of the low radiance contrast at these long wavelengths.

Crowley et al., U.S. Pat. No. 4,969,748, rely on a similar reflectivity-based emissivity compensation technique at a single undisclosed wavelength in a separate chamber prior to processing. A detailed description is given of the algorithm used to compare data taken on sample wafers and compensate for the variations with temperature.

Moslehi et al., U.S. Pat. No. 5,156,461, also relies on reflection properties of the semiconductor in order to compensate for emissivity. In this case the optical setup allows for multipoint measurement of emissivity and hence temperature.

None of these references offers a satisfactory solution for the case of transparent wafers at low temperatures. Furthermore, none makes any explicit reference to the use of more than a single wavelength by the pyrometer, and none has the capability of varying the pyrometer wavelength during the temperature measurement.

Gat et al., U.S. Pat. No. 5,165,796, describe a temperature measurement apparatus which relies on self-emission measurements from a semiconductor wafer in two or more wavelength bands, 3.4 and 4.7 microns in the preferred embodiments. These measurements are carried out simultaneously. However, the exact algorithm utilizing the dual or multiple wavelength information is not explicitly described. As with the techniques previously described, this technique is also not applicable to transparent wafers at low temperatures.

Finally, Stein, U.S. Pat. No. 4,708,493, utilizes dual wavelength emission and reflection measurement to compensate for emissivity variations but continues to rely on target opacity.

It is therefore apparent that there remains a need to determine by non-contact means the temperature of real life wafers in a process environment.

One way of remotely monitoring the temperature of a body includes projecting light of known spectral content onto a surface of the body, detecting the light reflected from the body, and measuring the shift in the spectral location of the optical absorption edge in the reflected light as compared to the projected light, to thereby provide a measurement of the temperature of the body.

The body may be a light-transmissive body, particularly a semiconductive body, in which the light detected is that reflected directly from the near side of the body, as well as that passing through the body and reflected back through the body from the far side.

Such a method is particularly useful for remotely monitoring the temperature of a semiconductor wafer as it is being processed, and provides a number of important advantages over the existing temperature measuring techniques.

Thus, the temperature range over which the technique is applicable to semiconductor wafers is from 900° K down to absolute 0° K, in contrast with the radiometric technique which is virtually inapplicable at wafer temperatures below 500° K. The processing of the semiconductor wafer consists of depositing thin layers of materials such as metals on one surface of the wafer. The light used to monitor the temperature of the wafer is directed at the opposite surface of the wafer. The surface whereon the thin layers are deposited is conventionally called the "front" surface of the wafer, and the opposite surface is conventionally called the "back" surface of the wafer. The same convention is followed herein: the surface from which the incident light is reflected directly is called herein the "back" surface, and the surface from which the incident light is reflected after passing through the body is called herein the "front" surface, it being understood that these designations are arbitrary, and do not limit the scope of the present invention to directing light at the back surface of a semiconductor wafer.

SUMMARY OF THE INVENTION

According to the present invention there is provided a method for measuring a temperature of a body opaque to incident light in a first wavelength range and partly transmissive of light in a second wavelength ranges the method including the steps of: (a) illuminating the body, using light having at least one wavelength in the second wavelength range, the light being reflected from the body with a certain intensity; (b) measuring a signal representative of the intensity of the reflected light; (c) inferring a total reflectivity of the body from the signal; (d) estimating a component of the total reflectivity corresponding to light that passes through the body before being reflected, as a function of the at least one wavelength; and (e) inferring the temperature of the body from the function of the at least one wavelength.

According to the present invention there is provided a method for measuring the temperature of an opaque body, including the steps of: (a) illuminating the body, using light having a plurality of wavelengths, the light being reflected from the body with a certain intensity; (b) measuring a signal representative of the intensity of the reflected light; (c) inferring, from the signal, a reflectivity of the body, as a first function of the plurality of wavelengths; (d) measuring an intensity of light emitted passively from the body, at the plurality of wavelengths; and (e) inferring the temperature of the body from the inferred reflectivity and from the measured intensity of emitted light.

According to the present invention there is provided an apparatus for measuring the temperature of a body, including: (a) a light source, for illuminating the body with illuminating light; (b) a detector for detecting light emitted and reflected from the body; and (c) a mechanism for inferring, from a signal component representative of an intensity of light reflected from the body, a first reflectivity component corresponding to light reflected directly from the body and a second reflectivity component corresponding to light that passes through the body before being reflected, and inferring the temperature of the body from the second reflectivity component.

As used herein, the term "light" refers to suitable electromagnetic radiation, and is not limited to visible light. The range of wavelengths usually used in the present invention includes both visible light and near-infrared light.

At wavelengths longer than the optical absorption edge of a semiconductor body, part of the light incident on the back surface of the body is reflected directly, and part of the light enters the body, passes through the body to the front surface, is reflected by the front surface, and passes back through the body and out the back surface. The total intensity of the light reflected from the back surface includes a component corresponding to the directly reflected light and a component corresponding to the light that passes through the body and is reflected by the front surface. At wavelengths shorter than the optical absorption edge, all of the light reflected from the back surface of the body is reflected directly. Therefore, the component of the intensity of the reflected light, as a function of wavelength, that corresponds to light that passes through the body before being reflected, provides a sharper measure of the spectral location of the optical absorption edge than does the total intensity of the reflected light. According to one aspect of the present invention, the other component of the reflected intensity, i.e., the component corresponding to light reflected directly from the body, is estimated and removed from the total reflected intensity, to provide an estimate of the component of the intensity corresponding to light that passes through the body before being reflected. This estimation is done by fitting a model of the body to measurements of the reflectivity of the body at wavelengths shorter than the optical absorption edge, and predicting the reflectivity of the body at wavelengths longer than the optical absorption edge.

The detector used to measure the reflected light also detects light due to thermal emission by the body. The light reflected by the body is distinguished from light due to thermal emission by modulating the incident light and the detected light at two different frequencies. This allows the signal from the detector to be processed to resolve the signal into two components, one representative of the reflected light and the other representative of the emitted light. Preferably, this modulation is effected using a rotary chopper wheel with two annular arrays of equally-spaced openings. The incident light passes through one of the arrays on its way to the body, and the reflected and emitted light pass through the other array on their way to the detector. Reflected light is described herein as arriving at the detector via an "active channel". Light originating in thermal emission is described herein as arriving at the detector via a "passive channel". The function of the modulation is to distinguish the active channel component of the detector signal from the passive channel component of the detector signal.

The present invention alternatively provides a method and apparatus for measuring the temperature of an opaque body. Because the reflected component of the detected light intensity is distinguished from the emitted component, both the reflectivity and the emissivity of the body are determined from the measurements, as functions of wavelength. The emitted intensity then is corrected for the (generally) non-unitary emissivity of the body to provide an equivalent black body intensity, and either Wien's Law or Planck's Law is used to infer the temperature of the body. The wavelength range is selected to minimize the temperature measurement error.

Thus, as an example, a silicon wafer having a relatively low level of dopant impurity is generally light-transmissive or transparent in the infrared region beyond 1.1 microns at room temperature, whereas highly doped wafers are generally opaque throughout the visible and the infrared region. An apparatus constructed in accordance with the foregoing features of the present invention is thus capable of measuring the temperature of both types of wafers, the temperature being measured by the shift in the spectral location of the absorption edge with respect to light-transmissive wafers, and by emissivity compensated self emission with respect to opaque wafers.

Further features and advantages of the invention will be apparent from the description below.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a temperature measuring method and apparatus which can be used to remotely monitor the temperature of bodies, such as wafers.

The principles and operation of a method and apparatus according to the present invention may be better understood with reference to the drawings and the accompanying description.

An important feature of the present invention is the capability to measure both spectral reflectivity and spectral emission through the same optical system. Further features and advantages of this will be apparent from the descriptions below. One embodiment of a system according to the present invention is shown in FIG. 1 in which a monochromator is used as both a spectral reflectometer and as a spectrally scanning pyrometer.

Figure 1:
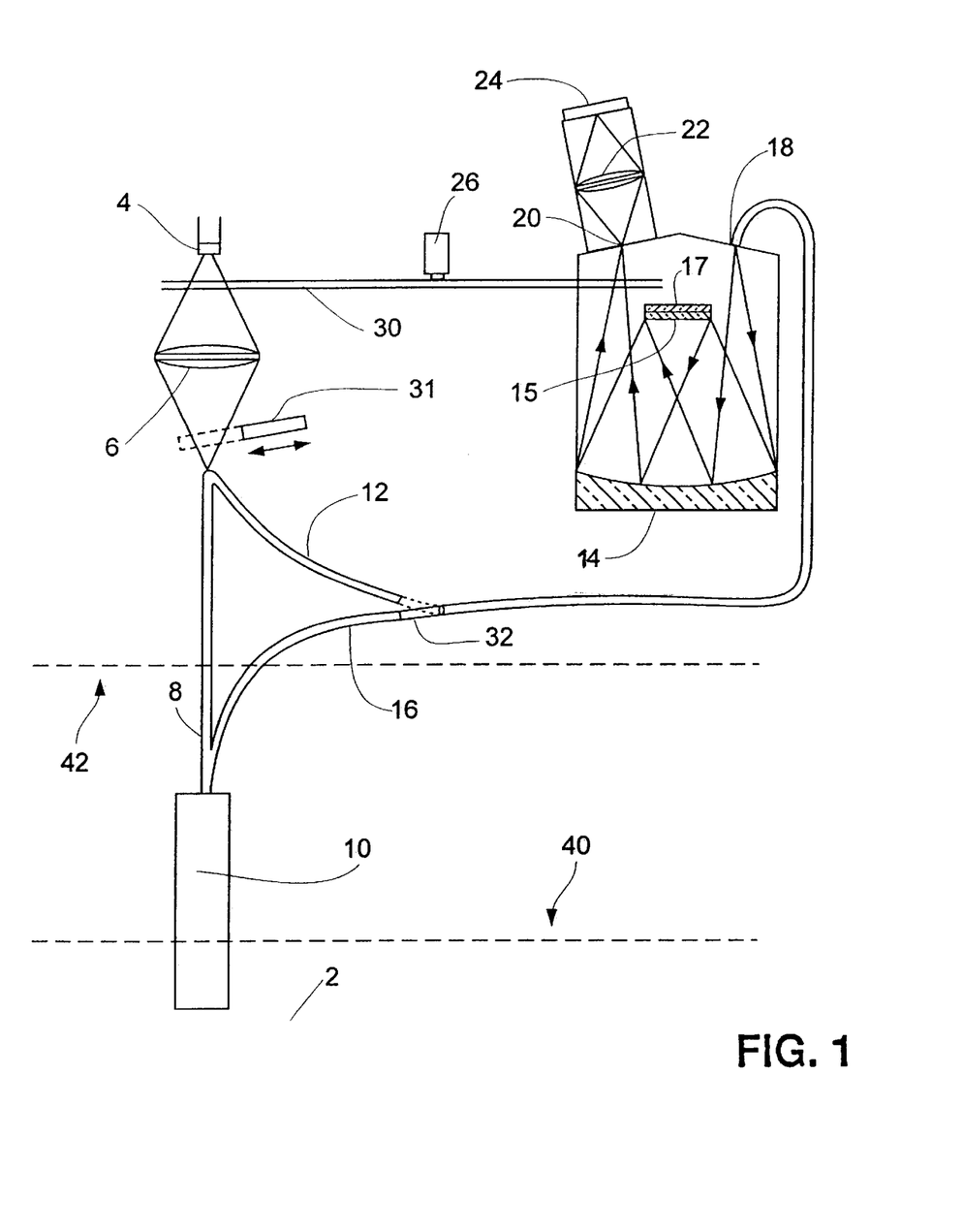
FIGS. 1 and 1A illustrate one form of apparatus constructed in accordance with the present invention, with FIG. 1A schematically showing a typical overall system.

Reference is first made to FIG. 1 illustrating one form of apparatus constructed in accordance with the present invention for measuring the temperature of a wafer 2, which may be either light-transmissive if having a low dopant concentration, or opaque if having a high dopant concentration. The light is projected onto the back surface of wafer 2, from a light source 4 via a lens 6, an optical fiber 8, and a quartz rod 10. A second optical fiber 12 directs the projected light to a spherical mirror 14. Mirror 14 also receives the light reflected from wafer 2, as well as the light emitted from the wafer, via quartz rod 10 and a further optical fiber 16.

In the embodiment described below, the active and passive channels are optically identical, i.e., they follow the same optical path through the monochromator to detector 24. However, the optical signals in the two channels are separated for purposes of detection using modulation at different frequencies, as described below.

The light from the two optical fibers 12 and 16 is projected onto spherical mirror 14 via a slit 18. The light reflected from spherical mirror 14 reflects off diffraction grating 15 to spectrally disperse the light reflected again off spherical mirror 14 and passing through another slit 20. In the second measurement channel, the light may alternatively be reflected off a planar mirror 17 mounted on the back of diffraction grating 15 after rotating diffraction grating 15 in order to collect all wavelengths of light simultaneously, instead of spectrally scanning. This improves the signal to noise ratio of the second channel, for emission measurements at low temperatures.

The apparatus illustrated in FIG. 1 further includes a motor 26 which rotates a chopper disk 30 in the path of the light from source 4 protected onto wafer 2, and also in the path of the light returned from the wafer 2 via optical fiber 16 and reflected by spherical mirror 14 to detector 24.

The light returned from wafer 2 to detector 24 thus includes both reflected light, which is used for measuring the temperature of the wafer when the wafer is a light-transmissive body, and emitted light, which is used for measuring the temperature of the wafer when it is an opaque body. Chopper disk 30 modulates the light directed towards detector 24 at different frequencies to enable the two channels to be separated from each other.

As depicted schematically in FIG. 1, the junction of optical fibers, 12 and 16, is in the form of a switch 32, so that when switch 32 is in one position ("down" in FIG. 1) light passes from optical fiber 16 to slit 18 while when switch 32 is the other position ("up" in FIG. 1) light passes from optical fiber 12 to slit 18.

Furthermore, a system according to the present invention may optionally include a light source blocker 31 which may be operated, for example, by a solenoid. Light source blocker 31 is capable of periodically blocking light coming from light source 4 via lens 6 and its function is described below.

The current optical configuration results in the illumination of wafer 2 with polychromatic light directly from light source 4. It will be appreciated, however, that by switching the positions of light source 4 and detector 24, wafer 2 may be illuminated by monochromatic radiation as a result of having traversed the optical system via the monochromator in the reverse direction. This alternative configuration may have certain advantages over the configuration shown in FIG. 1, such as improved optical throughput in the passive channel, resulting in lower minimum detectable temperature.

In order to allow the independent detection, as two separate and distinct signals, of the radiation reflected from the wafer (active channel) and the radiation emitted from the wafer (passive channel), the signal falling on detector 24 is processed as follows:

Radiation originating from source 4 is modulated at an angular frequency $\omega_1$ by chopper 30 and is transmitted via fiber 8 to wafer 2 from which it is reflected. It then passes into the monochromator via fiber 16 and is modulated a second time at an angular frequency $\omega_2$ by chopper 30 after which it impinges on detector 24. Radiation which traverses this path is considered to be in the "active channel".

Radiation emanating from wafer 2 passes via fiber 16 into the monochromator and is modulated only at frequency $\omega_2$ by chopper 30 after which it impinges on detector 24. Radiation which traverses this path is considered to be in the "passive channel".

Figure 3:
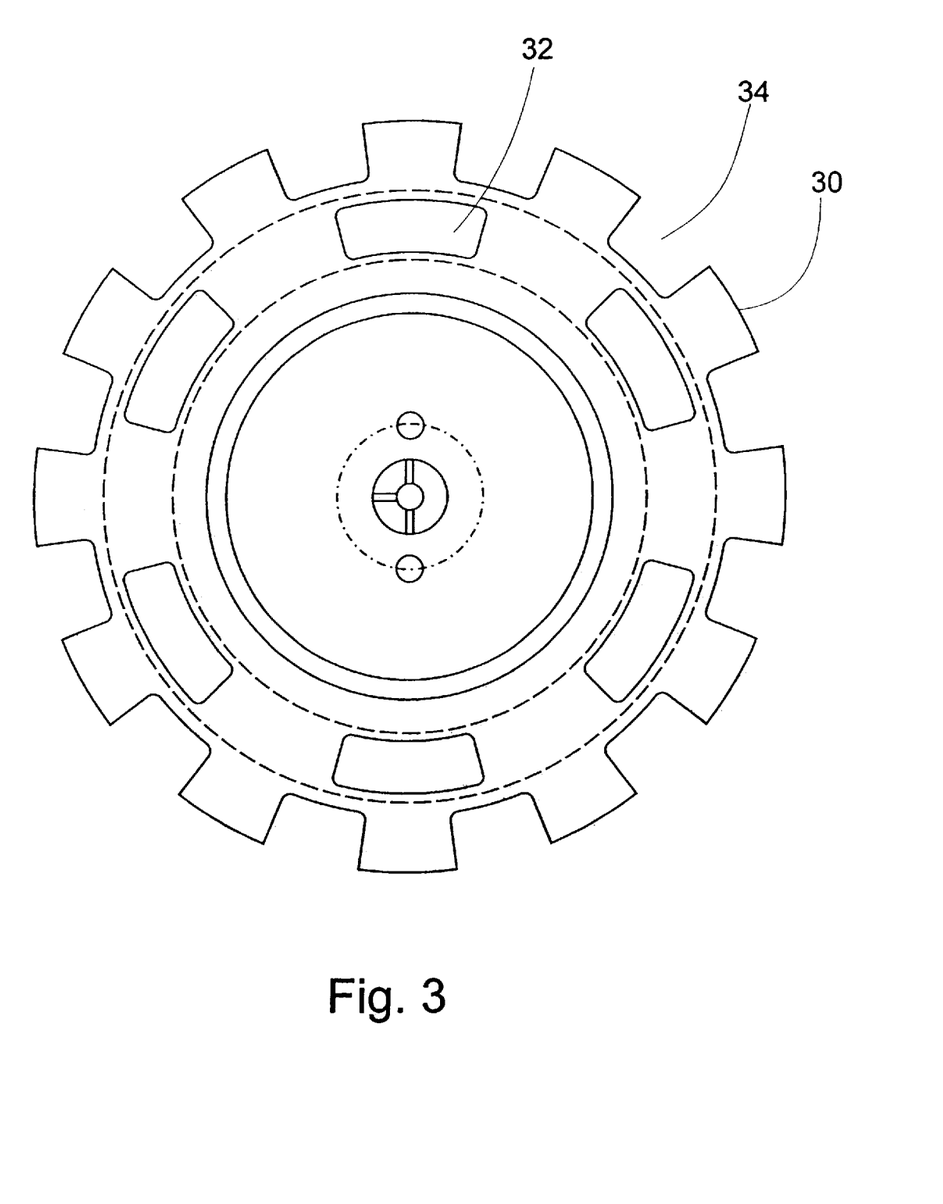
FIG. 3 more particularly illustrates the chopper disk used in the apparatus of FIG. 1 to distinguish the two channels.

FIG. 3 more particularly illustrates the construction of chopper disk 30 in order to produce this modulation function. Thus, as shown in FIG. 3, the chopper disk 30 includes an inner annular array of openings 33, and an outer annular array of openings 34. It will be seen that the inner annular array of openings 33 includes a lower number of openings than the outer annular array of openings 34. Accordingly, openings 33 modulate the light passing therethrough at a lower modulation frequency than openings 34.

Let $K_a$ represent the amplitude of the active signal, and let $K_p$ represent the amplitude of the passive signal. The modulation imposed on the signals by chopper 30 has a trapezoidal waveform, whose Fourier expansion as a function of time t is of the form:

$$1 + \sum_{n=1}^{\infty} a_n \sin n\omega t \quad (1)$$

where $a_n$ are the Fourier sine coefficients of the expansion and $\omega$ is the modulation frequency. The modulated active signal, which is modulated at both frequency $\omega_1$ and at frequency $\omega_2$, thus has an amplitude A of the form $$A = K_a \left[1 + \sum_{n=1}^{\infty} a_n \sin n\omega_1 t\right]\left[1 + \sum_{m=1}^{\infty} a_m \sin m\omega_2 t\right] \quad (2)$$

$$= K_a \left[1 + \sum_{n=1}^{\infty} a_n \sin n\omega_1 t + \sum_{m=1}^{\infty} a_m \sin m\omega_2 t + \sum_{n=1}^{\infty}\sum_{m=1}^{\infty} a_n a_m \sin n\omega_1 t \sin m\omega_2 t\right]$$

whereas the modulated passive signal, which is modulated only at frequency $\omega_2$, has an amplitude P of the form $$P = K_p \left[1 + \sum_{n=1}^{\infty} a_n \sin n\omega_2 t\right] \quad (3)$$

In the following analysis, the preferred special case of $\omega_1 = \omega$, $\omega_2 \omega_1$ will be considered. This special case also corresponds to chopper disk 30, as depicted in FIG. 3, with 6 openings 33 and 12 openings 34. Using the identity $$\sin z_1 \sin z_2 = \frac{\cos(z_1 - z_2) - \cos(z_1 + z_2)}{2} \quad (4)$$

then gives $$A = K_a \left[1 + \sum_{n=1}^{\infty} a_n \sin n\omega t + \sum_{m=1}^{\infty} a_m \sin 2m\omega t + \frac{1}{2}\sum_{n=1}^{\infty}\sum_{m=1}^{\infty} a_n a_m \cos(n - 2m)\omega t - \frac{1}{2}\sum_{n=1}^{\infty}\sum_{m=1}^{\infty} a_n a_m \cos(n + 2m)\omega t\right] \quad (5)$$

and $$P = K_p \left[1 + \sum_{n=1}^{\infty} a_n \sin 2n\omega t\right] \quad (6)$$

The total signal produced by detector 24 is $S_d = A + P$.

To separate $S_d$ into its active and passive components, it is high pass filtered to eliminate its DC component, and then electronically multiplied by a square wave of appropriate angular frequency, either $\omega$ or $2\omega$, that is synchronized and in phase with the optical signal passing through chopper disk 30. The Fourier series for a square wave of amplitude ±1 and angular frequency $\omega$ is:

$$\frac{4}{\pi}\sum_{l=1}^{\infty} \frac{1}{2l-1} \sin(2l-1)\omega t \quad (7)$$

Multiplying the time-varying portion of $S_d$ by a square wave of angular frequency $\omega$, and using the identity $$\cos z_1 \sin z_2 = \frac{\sin(z_1 + z_2) - \sin(z_1 - z_2)}{2} \quad (8)$$

gives the following expression for the resulting signal $S_a$:

$$S_a = \frac{2}{\pi} K_a \Bigg\{ \sum_{n=1}^{\infty}\sum_{l=1}^{\infty} \frac{a_n[\cos(n - 2l + 1)\omega t - \cos(n + 2l - 1)\omega t]}{2l - 1} + \quad (9)$$

$$\sum_{n=1}^{\infty}\sum_{l=1}^{\infty} \frac{a_n[\cos(2n - 2l + 1)\omega t - \cos(2n + 2l - 1)\omega t]}{2l - 1} +$$

$$\frac{1}{4}\sum_{n=1}^{\infty}\sum_{m=1}^{\infty}\sum_{l=1}^{\infty} \frac{a_n a_m[\sin(n - 2m + 2l - 1)\omega t - \sin(n - 2m - 2l + 1)\omega t]}{2l - 1} -$$

$$\frac{1}{4}\sum_{n=1}^{\infty}\sum_{m=1}^{\infty}\sum_{l=1}^{\infty} \frac{a_n a_m[\sin(n + 2m + 2l - 1)\omega t - \sin(n + 2m - 2l + 1)\omega t]}{2l - 1} \Bigg\} +$$

$$\frac{2}{\pi} K_p \sum_{n=1}^{\infty}\sum_{l=1}^{\infty} \frac{a_n[\cos(2n - 2l + 1)\omega t - \cos(2n + 2l - 1)\omega t]}{2l - 1}$$

$S_a$ then is low-pas filtered with a filter having a cutoff frequency much lower than $\omega$. This filters out all terms except for the cos(0) terms. The only such terms are those in the first set of sums for which $n - 2l + 1 = 0$, so the resulting low-pass filtered signal is:

$$S_a^{lp} = \left(\frac{2}{\pi} K_a\right) \sum_{n=1}^{\infty} \frac{a_n}{n} \quad (10)$$

thus isolating a signal proportional to the active signal and independent of the passive signal.

Similarly, multiplying the time-varying portion of $S_d$ by a square wave of angular frequency $2\omega$ gives the following expression for the resulting signal $S_p$:

$$S_p = \frac{2}{\pi} K_a \Bigg\{ \sum_{n=1}^{\infty}\sum_{l=1}^{\infty} \frac{a_n[\cos(n - 4l + 2)\omega t - \cos(n + 4l - 2)\omega t]}{2l - 1} + \quad (11)$$

$$\sum_{n=1}^{\infty}\sum_{l=1}^{\infty} \frac{a_n[\cos(2n - 4l + 2)\omega t - \cos(2n + 4l - 2)\omega t]}{2l - 1} +$$

$$\frac{1}{4}\sum_{n=1}^{\infty}\sum_{m=1}^{\infty}\sum_{l=1}^{\infty} \frac{a_n a_m[\sin(n - 2m + 4l - 2)\omega t - \sin(n - 2m - 4l + 2)\omega t]}{2l - 1} -$$

$$\frac{1}{4}\sum_{n=1}^{\infty}\sum_{m=1}^{\infty}\sum_{l=1}^{\infty} \frac{a_n a_m[\sin(n + 2m + 4l - 2)\omega t - \sin(n + 2m - 4l + 2)\omega t]}{2l - 1} \Bigg\} +$$

-continued $$\frac{2K_p}{\pi}\sum_{n=1}^{\infty}\sum_{l=1}^{\infty}\frac{a_n[\cos(2n-4l+2)\omega t-\cos(2n+4l-2)\omega t]}{2l-1}$$

This time, there are three sets of sums (the first, second and fifth) with cos(0) terms, so after low-pass filtering as above, $S_p$ turns into:

$$S_p^{lp}=\frac{6K_a+2K_p}{\pi}\sum_{n=1}^{\infty}\frac{a_n}{n} \quad (12)$$

so that $$S_p^{lp}-3S_a^{lp}=\frac{2}{\pi}K_p\sum_{n=1}^{\infty}\frac{a_n}{n} \quad (13)$$

isolating a signal proportional to the passive signal. Alternatively, blocker 31 may be closed to eliminate the active signal, i.e., set $K_a=0$. This enhances the precision of the measurement at low temperatures, where the passive signal $K_p$ may be considerably smaller than the active signal $K_a$.

Another important aspect of the measurement technique is the measurement of the reference channel via fiber 12. In order to eliminate other signals while this signal is being measured a solenoid shutter switch 32 is operated Which cuts off transmission via fiber 16 and allows transmission to the detector only via fiber 12. The signal is detected electronically in an identical fashion to the active channel above.

Figure 1A:
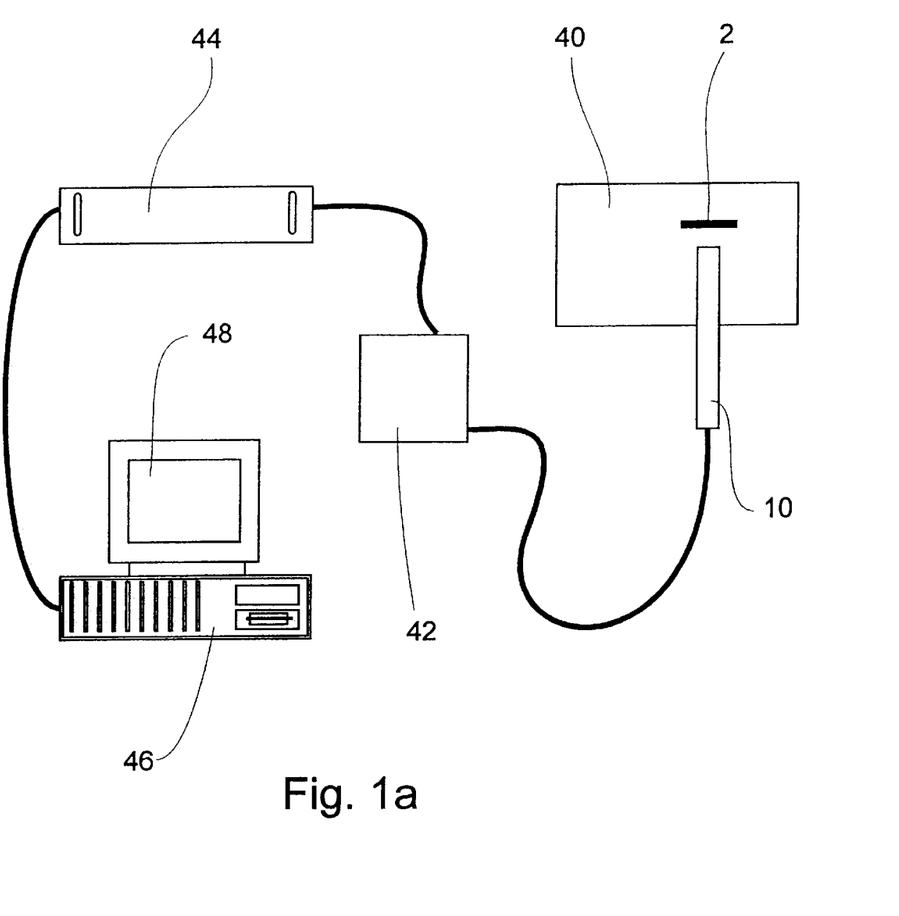

FIG. 1A schematically depicts an overall system according to the present invention. Here wafer 2 is located in a process chamber 40 which also accommodates a portion of quartz rod 10. Quartz rod 10 is connected to an optical head 42 which is shown in more detail in FIG. 1. Optical head 42 is typically connected to rack mount electronics 44 which is, in turn, connected to a suitable computer or processor 46. Analog operations such as the filtering of the signals from detector 24 and the electronic multiplication of the hi-pass filtered signals by square waves are performed by rack mount electronics 44. Subsequent digital processing is performed by processor 46. A suitable display 48 connected to processor 46 can be used to show wafer temperatures.

Figure 2:
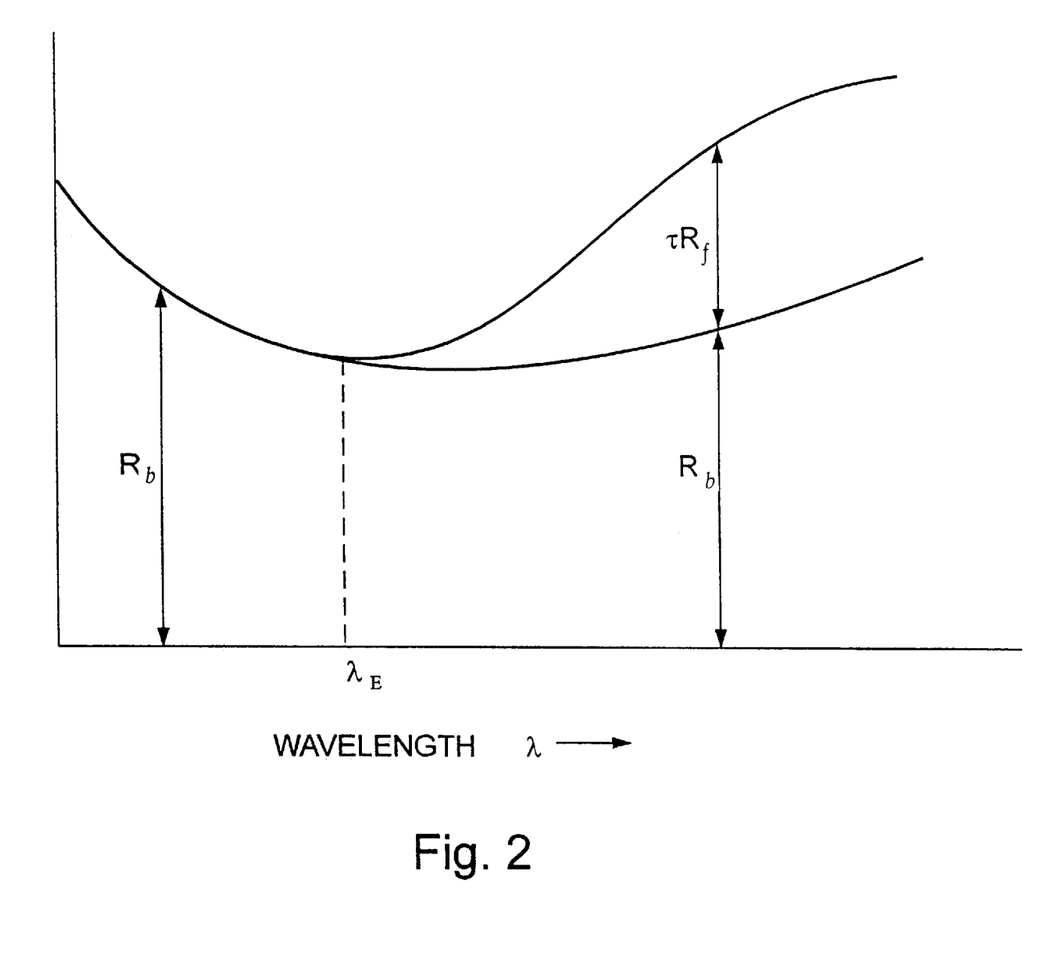
FIG. 2 is a conceptual graph illustrating the principle of the present invention as applied to transmissive bodies.

FIG. 2 is a conceptual graph, of the reflectivity R of wafer 2 as a function of wavelength $\lambda$, that illustrates the principle of the present invention as applied to transmissive wafers. At wavelengths shorter than the optical absorption edge $\lambda_E$, all of the light incident on the back surface of wafer 2 is either directly reflected or absorbed, so the total reflectivity R is identical to the reflectivity component $R_b$ attributable to direct reflection from the back surface of wafer 2. At wavelengths longer than $\lambda_E$, some of the light incident on the back surface of wafer 2 propagates through wafer 2 to the front surface of wafer 2, where it is reflected, propagates back through wafer 2, and emerges from the back surface of wafer 2. The total reflectivity $R(\lambda)$ at wavelengths longer than $\lambda_E$, on the assumption that multiple internal reflections are negligible, is given by the following expression:

$$R(\lambda)=R_b(\lambda)+(1-R_b(\lambda))^2\tau(\lambda)R_f(\lambda) \quad (14)$$

where $R_f(\lambda)$ is the reflectivity of the front surface of wafer 2 with respect to light incident thereon from the interior of wafer 2, and $\tau(\lambda)$ is an absorption coefficient to account for absorption of light during propagation through wafer 2. Solving for $\tau(\lambda)R_f(\lambda)$ gives:

$$\tau(\lambda)R_f(\lambda)=\frac{R(\lambda)-R_b(\lambda)}{(1-R_b(\lambda))^2} \quad (15)$$

The processing of wafer 2 to fabricate integrated chips on the front surface of wafer 2 consists of depositing thin layers of various insulators (typically $SiO_2$), semiconductors (typically Si) and metals (for example, Al) on the front surface of wafer 2. During this deposition, these materials also are deposited in thin layers on the back surface of wafer 2. Therefore, according to the present invention, the back surface of wafer 2 is modeled as a plane layer medium, consisting of layers of thickness $d_j$ and complex index of refraction $n_j+ik_j$, where j is the layer index; $n_j$ and $k_j$ are the real and imaginary parts, respectively, of the index of refraction of layer j, and i is the square root of −1. The forward problem, of predicting the retlectivity $R(\lambda)$ at normal incidence of such a plane layer medium, is well characterized and is described, for example, in O. S. Heavens, *Optical Properties of Thin Solid Films* (Dover, 1991), Chapter 4, which is incorporated by reference for all purposes as if fully set forth herein. According to the present invention, $R(\lambda)$ of wafer 2 is measured at wavelengths shorter than $\lambda_E$, and values of the layer thicknesses and layer complex resistivities are inferred from the measured values of $R(\lambda)$. This inverse problem also is well characterized. See for example, William H. Press, Saul A. Teukolsky, William T. Vetterling and Brian P. Flannery, *Numerical Recipes in C, Second Edition*, Cambridge University Press, 1992, Chapters 15 and 18, which are incorporated by reference for all purposes as if fully set forth herein, particularly section 15.5. For silicon wafers undergoing standard processing, about 50 values of $R(\lambda)$ are measured, in a wavelength range between 0.6 microns and 0.95 microns; and a plane layer model with one or two layers usually is sufficient to model the back surfaces of these wafers. The parameters thus determined are assumed to be independent of wavelength $\lambda$, except for the complex index of refraction of wafer 2, which must be known a priori as a function of wavelength $\lambda$. (Indeed, the very existence of an optical absorption edge is due to the complex index of refraction of wafer 2 being a function of wavelength $\lambda$.) For wafers 2 made of pure semiconducting materials such as Si, the complex indices of refraction have been measured as functions of wavelength $\lambda$. See, for example, Edward D. Palik. Handbook of Optical Constants of Solids (Academic Press, 1985). Given the layer parameters determined by solving the inverse problem for $\lambda<\lambda_E$, and assuming an infinitely thick wafer (a halfspace), the forward problem is solved for $\lambda>\lambda_E$ to estimate $R_b(\lambda)$ at wavelengths longer than $\lambda_E$, and this estimated $R_b(\lambda)$ is subtracted from $R(\lambda)$ to give an estimate of $\tau R_f$. Of course, this estimate of $\tau R_f$ is necessarily incorrect, because $R_b(\lambda)$ is extrapolated from wavelengths shorter than $\lambda_E$, where wafer 2 is opaque, to wavelengths longer than $\lambda_E$, where wafer 2 is at least partly transparent; but temperature estimates based on this estimated $\tau R_f$ are more accurate than temperature estimates based on uncorrected $R(\lambda)$.

The apparatus of FIG. 1 is calibrated by substituting a calibration mirror, of known reflectivity, for wafer 2, and measuring the signal $V_m(\lambda)$ thus obtained at detector 24 with switch 32 in the "down" position, and the signal $V_s*(\lambda)$ obtained with switch 32 in the "up" position. During measurements on wafer 2, $R(\lambda)$ is obtained from $V(\lambda)$, the signal obtained with switch 32 in the "down" position, and $V_s(\lambda)$, the signal obtained with switch 32 in the "up" position, using the expression $$R(\lambda) = \frac{V(\lambda)\left(\frac{V_s^*(\lambda)}{V_s(\lambda)}\right) - V_b(\lambda)}{V_m(\lambda) - V_b(\lambda)} \quad (16)$$

where $V_b(\lambda)$ is the spectral signal of internal reflections in the light path, measured in the absence of wafer 2.

The apparatus of FIG. 1 is further calibrated by measuring $\tau R_f$ for a reference wafer 2 at a series of known temperatures $\{T_k\}$. For example, a thermocouple may be embedded in reference wafer 2, and the temperature of process chamber 40 may be varied over the desired range of temperatures $\{T_k\}$. This provides a database of measurements of $\tau R_f$ as a function of wavelength $\lambda$ and temperature T for a particular type of wafer 2. When a series of measurements of $\tau R_f$ have been obtained at several wavelengths $\lambda$ for a wafer 2 of unknown temperature T, the temperature of wafer 2 is determined by finding the temperature T at which the measured $\tau R_f(\lambda)$ best fits the database reference surface $\tau R_f(\lambda,T)$, for example, by least squares.

Equation (14) is a approximation of the multiple reflection formula for two reflecting planes whose separation is much larger than the correlation length of the light source. The full formula, including the effect of roughness and numerical aperture losses, is:

$$R(\lambda) = \alpha(\lambda)R_b(\lambda) + (1 - R_b(\lambda))^2 \frac{\tau(\lambda)R_f(\lambda)\alpha(\lambda)}{1 - \tau(\lambda)R_f(\lambda)R_b(\lambda)\sigma\alpha(\lambda)} \quad (17)$$

where $\alpha(\lambda)$ is the loss factor due to roughness of the back side of wafer 2, and $\sigma$ is a factor corresponding to the loss due to the wide numerical aperture of the optics. The accuracy of the method of the present invention can be improved by evaluating $\alpha(\lambda)$, by measuring $R(\lambda)$ for both wafer 2 and a polished reference wafer at wavelengths shorter than $\lambda_E$, and including $\alpha(\lambda)$ in the estimation of $\tau R_f$.

A further improvement in accuracy may be obtained by performing measurements on wafer 2 at a temperature sufficiently low that $\tau(\lambda)$ is unity. The procedures outlined above then give a direct measure of $R_f(\lambda)$. Dividing the $\tau R_f$ estimated at the higher temperatures by this low temperature $R_f$ gives an estimate of $\tau(\lambda)$, which is a more sensitive indicator of temperature than the product of $\tau$ and $R_f$. A database of $\tau(\lambda,T)$ is constructed as described above using a reference wafer 2, and the temperature of a test wafer 2 is determined by fitting the estimated $\tau(\lambda)$ to this reference $\tau(\lambda,T)$ surface.

The measurement of optically opaque wafers via the passive channel relies on a number of physical principles as follows. First is Kirchoff's law for opaque wafers:

$$\epsilon = 1 - R \quad (18)$$

where $\epsilon$ is the wafer emissivity and R is the wafer reflectivity. The measurement of reflectivity R, as described above, implicitly measures emissivity $\epsilon$. The second is termed, for convenience, "Radiance Contrast Tracking" which is described below.

The temperature of the wafer may be ascertained by precise estimation of $L_{bb}$, the emission radiance from a perfect blackbody which under the condition of the assumption below may be related to the body's temperature by Planck's function:

$$L_{bb} = \frac{\delta\lambda C_1}{\lambda^5 \exp\left(\frac{C_2}{\lambda T_{bb}}\right) - 1} \quad (19)$$

where $C_1$ is the First Radiation Constant and $\delta\lambda$ is the spectral bandpass of the pyrometer, and the emitting area and solid angle are both unity. The wafer temperature $T_w$ now can be calculated by substituting the actual light emitted by the wafer as a function of wavelength, $L_w(\lambda)$ for $L_{bb}(\lambda)$, where $L_w = \epsilon L_{bb}$ and $\epsilon$ is the wafer emissivity as described above. Equation 19 then is a function of $L_w$ rather than $L_{bb}$.

Under the assumption that the product of the measurement wavelength and the wafer temperature is small compared to the Second Radiation Constant $C_2$, i.e., $$\lambda T_w << C_2 = 14,400\mu°K \quad (20)$$

Planck's law is very accurately approximated by Wien's law:

$$L_{bb} = C_1 \delta\lambda\lambda^{-5} e^{-\frac{C_2}{\lambda T_{bb}}} \quad (21)$$

For this case, the uncertainty $\Delta T$ in temperature T due to the uncertainty $\Delta L_{bb}$ in the blackbody emission radiance $L_{bb}$ may be derived as follows:

$$\frac{\Delta L_{bb}}{L_{bb}} = \left(\frac{dL_{bb}}{dT}\right)\left(\frac{\Delta T}{L_{bb}}\right) \approx \frac{C_2}{\lambda T^2}\Delta T \quad (22)$$

Figure 4:
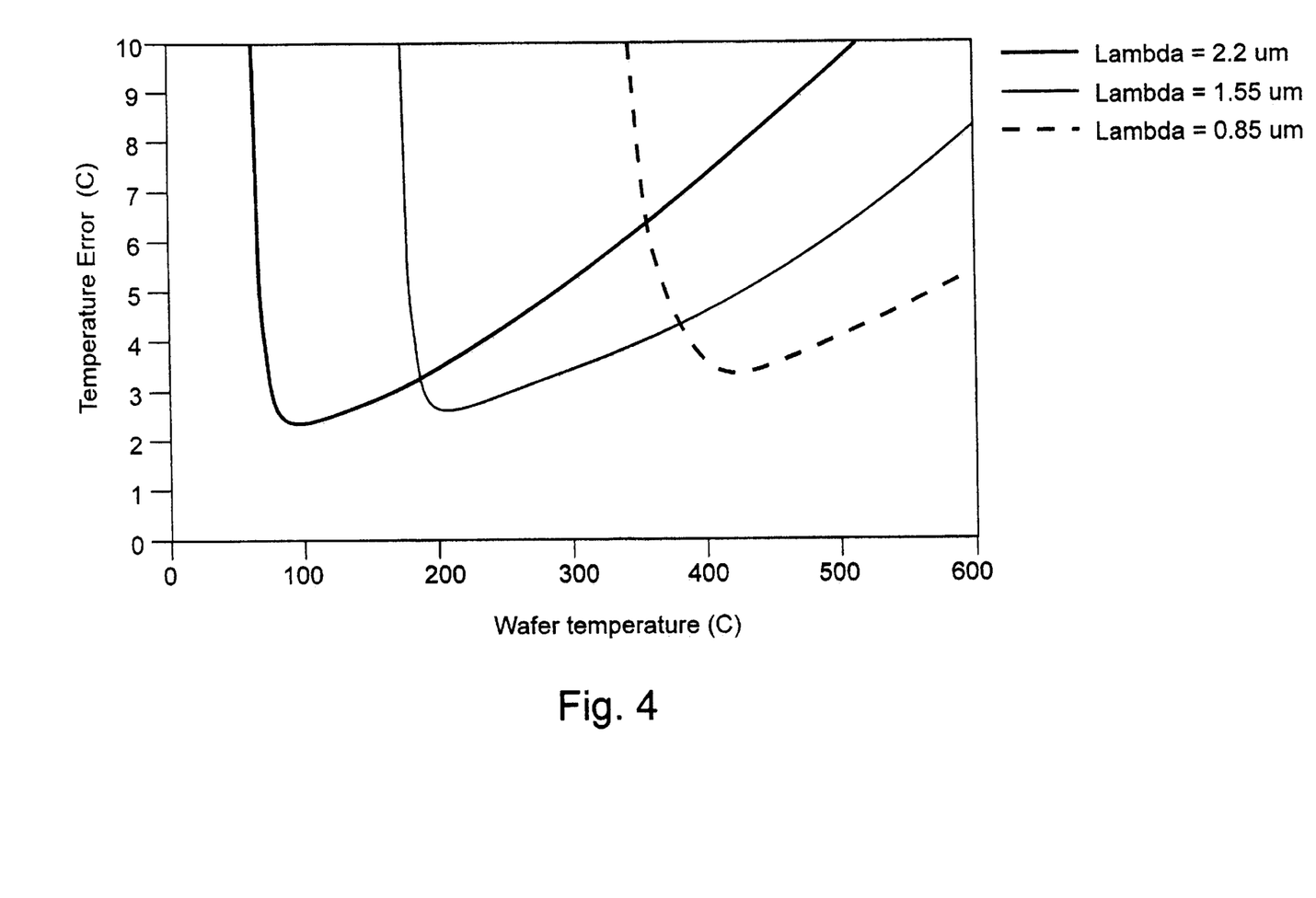
FIG. 4 is a plot of temperature error $\Delta T$, versus wafer temperature at different wavelengths, with respect to opaque bodies.

From equation (22) it is apparent that for a given precision of blackbody emission, which is dependent on measurement of wafer emission and wafer emissivity, the expected error $\Delta T$ in temperature reading increases with wavelength and with the square of the temperature of the wafer. Therefore, in order to maintain a constant reading temperature error as the temperature of the wafer rises, the measurement wavelength must be constantly reduced. This has been termed Radiance Contrast Tracking, and can be realized in the passive channel of the present invention. one embodiment of which is shown in FIG. 1 in which the wafer emission is measured via a monochromator. FIG. 4 is a plot of experimentally determined temperature error $\Delta T$ versus wafer temperature at different wavelengths and exhibits the above behavior. These curves follow equation (22) on their right sides. The left sides of the curves are dominated by electronic noise. So, for example, the temperature of an opaque body having a temperature near 100° C. is most accurately measured using wavelengths on the order of 2.2 microns, and the temperature of an opaque body having a temperature near 400° C. is most accurately measured using wavelengths on the order of 0.85 microns. It will be appreciated that the appropriate wavelength range for measuring the temperature of an opaque body of unknown temperature is best selected iteratively: a preliminary temperature measurement is used to select an appropriate wavelength range for a more accurate temperature measurement.

While the invention has been described with respect to a limited number of embodiments, it will be appreciated that many variations, modifications and other applications of the invention may be made.

What is claimed is:

1. A method for measuring a temperature of a body opaque to incident light in a first wavelength range and partly transmissive of light in a second wavelength range, the method comprising the steps of:

(a) illuminating the body, using light having at least one wavelength in the second wavelength range, said light being reflected from said body with a certain intensity;

(b) measuring a signal representative of said intensity of said reflected light;

(c) inferring a total reflectivity of the body from said signal;

(d) estimating a component of said total reflectivity corresponding to light that passes through the body before being reflected, as a function of said at least one wavelength; and (e) inferring the temperature of the body from said function of said at least one wavelength.

2. The method of claim 1, further comprising the steps of:

(f) illuminating the body, using light having at least one wavelength in the first wavelength range, said light being reflected from said body with a certain intensity;

(g) measuring a signal representative of said intensity of said reflected light of the first wavelength range; and (h) inferring a direct reflectivity of the body in the first wavelength range; and wherein said estimating, of said component of said total reflectivity corresponding to light that passes through the body before being reflected, is effected by steps including:

(i) providing a parametrized model of the body for predicting said direct reflectivity of the body, (ii) adjusting said parameters so that said predicted direct reflectivity matches said measured direct reflectivity;

(iii) estimating a direct reflectivity of the body in the second wavelength range, using said model; and (iv) removing said estimated direct reflectivity from said total reflectivity.

3. The method of claim 1, wherein said measuring of said signal representative of said intensity of said reflected light is effected by the steps of:

(i) modulating said illuminating light at a first frequency; and (ii) modulating light received from the body at a second frequency, said received light including both said reflected light and thermally emitted light;

(iii) measuring a total intensity of said modulated received light; and (iv) recovering said intensity of said reflected light from said total intensity, based on said two modulation frequencies.

4. The method of claim 3, wherein said modulating is effected using a rotary chopper disk having a first annular array of openings for said modulating at said first frequency and a second annular array of openings for said modulating at said second frequency.

5. A method of measuring the temperature of an opaque body, comprising the steps of:

(a) selecting a plurality of wavelengths for illuminating the body, at least one of said wavelengths being selected iteratively to minimize an error in the temperature measurement;

(b) illuminating the body, using light having said plurality of wavelengths, said light being reflected from said body with a certain intensity;

(c) measuring a signal representative of said intensity of said reflected light;

(d) inferring, from said signal, a reflectivity of the body, as a first function of said plurality of wavelengths;

(e) measuring a signal representative of an intensity of light emitted passively from the body, at said plurality of wavelengths; and (f) inferring the temperature of the body from said inferred reflectivity and from said signal representative of said intensity of emitted light.

6. The method of claim 5, wherein said intensity of said reflected light and said intensity of said emitted light are measured using a common detector providing a common signal, the method further comprising the steps of:

(h) modulating said illuminating light at a first frequency;

(i) modulating said reflected light and said emitted light at a second frequency; and (j) recovering said signals representative of said intensities from said common signal, based on said two modulation frequencies.

7. The method of claim 6, wherein said modulating is effected using a rotary chopper disk having a first annular array of openings for said modulating at said first frequency and a second annular array of openings for said modulating at said second frequency.

8. An apparatus for measuring the temperature of a body, comprising (a) a light source, for illuminating the body with illuminating light;

(b) a detector for detecting light emitted and reflected from the body; and (c) a mechanism for inferring, from a signal component representative of an intensity of light reflected from the body, a first reflectivity component corresponding to light reflected directly from the body and a second reflectivity component corresponding to light that passes through the body before being reflected, and inferring the temperature of the body from said second reflectivity component.

9. The apparatus of claim 8, further comprising:

(d) a mechanism for modulating said illuminating light at a first frequency, and said emitted and reflected light at a second frequency.

10. The apparatus of claim 9, wherein said modulation mechanism includes a rotary chopper disk having a first annular array of openings, wherethrough said illuminating light is passed for modulation at said first frequency, and a second annular array of openings, wherethrough said reflected and emitted light is passed for modulation at said second frequency.

11. The apparatus of claim 8, wherein said illuminating light is polychromatic.

12. The apparatus of claim 10, wherein said illuminating light is monochromatic.

13. The apparatus of claim 8, further comprising:

(d) a mechanism for conveying said illuminating light from said light source to the body.

14. The apparatus of claim 13, wherein said mechanism for conveying said illuminating light from said light source to the body includes:

(i) a quartz rod;

(ii) a first optical fiber for conveying said illuminating light to said quartz rod; and (iii) a lens for focusing said illuminating light from said light source onto said first optical fiber.

15. The apparatus of claim 14, further comprising:

(e) a light source blocker for reversibly blocking said illuminating light from said optical fiber.

16. The apparatus of claim 14, wherein said quartz rod also receives said reflected and emitted light from the body, the apparatus further comprising:

(e) a second optical fiber for receiving said reflected and emitted light from said quartz rod.

17. The apparatus of claim 16, further comprising:

(f) a third optical fiber whereon said lens also focuses said illuminating light from said light source; and (g) a switch for alternatively:

(i) conveying said illuminating light from said third optical fiber to said detector, and (ii) conveying said reflected and emitted light to said detector.

* * * * *